(No Model.)  2 Sheets—Sheet 1.
W. D. MacQUESTEN.
ELECTRIC RAILWAY SYSTEM.
No. 429,199.  Patented June 3, 1890.
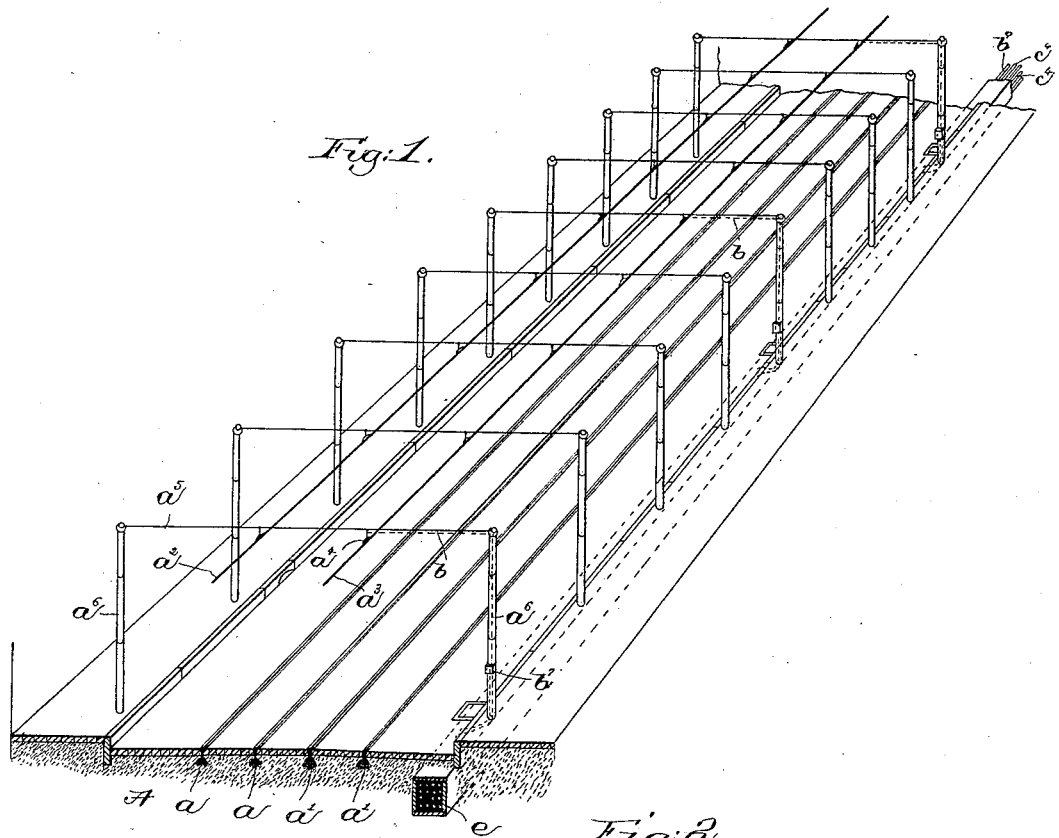
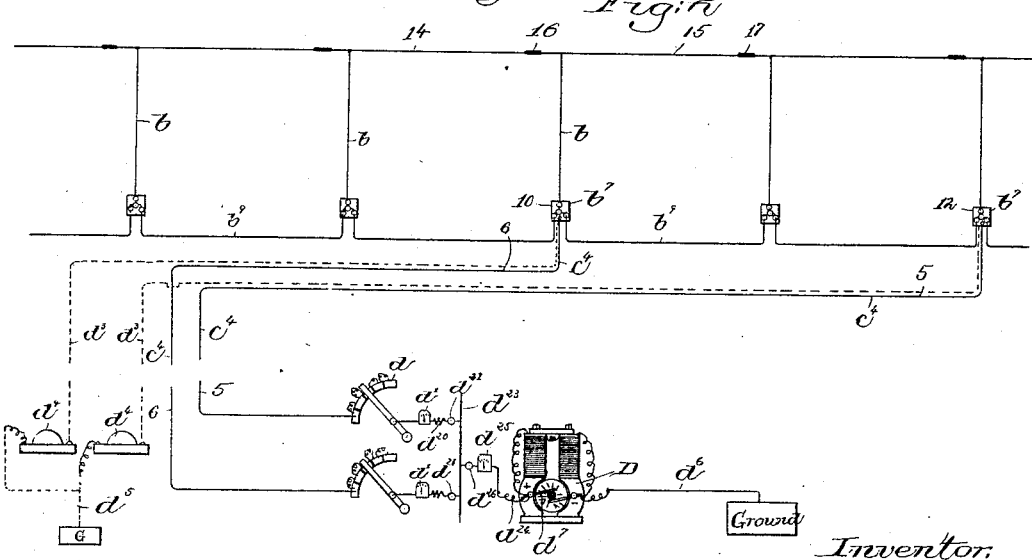
Witnesses,
Howard F. Eaton.
Edgar A. Goddin
Inventor:
William D. MacQuesten.
by Gregory Gregory
Attys.

(No Model.) 2 Sheets—Sheet 2.
W. D. MACQUESTEN.
ELECTRIC RAILWAY SYSTEM.
No. 429,199. Patented June 3, 1890.
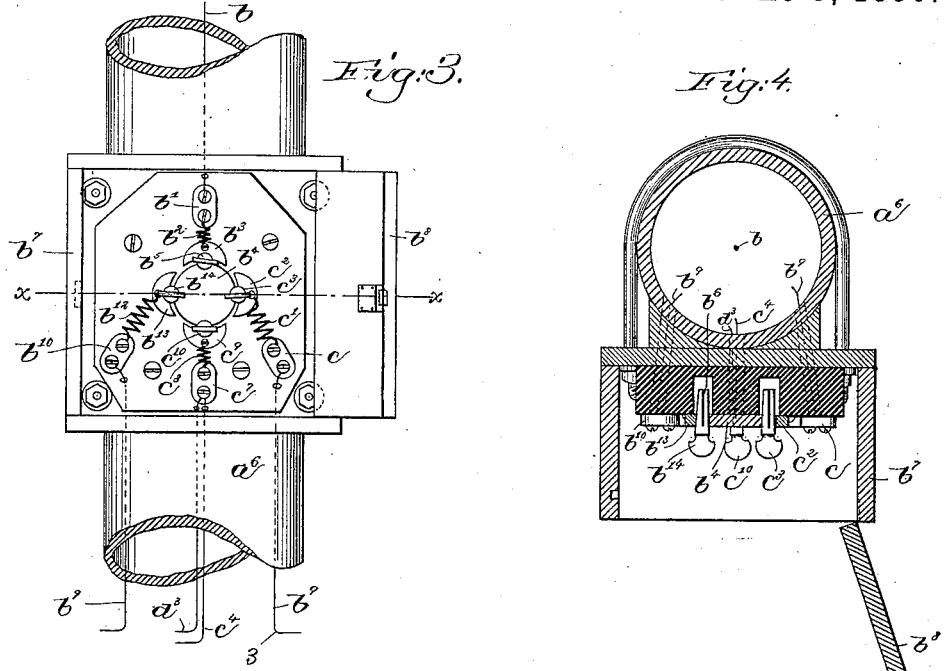
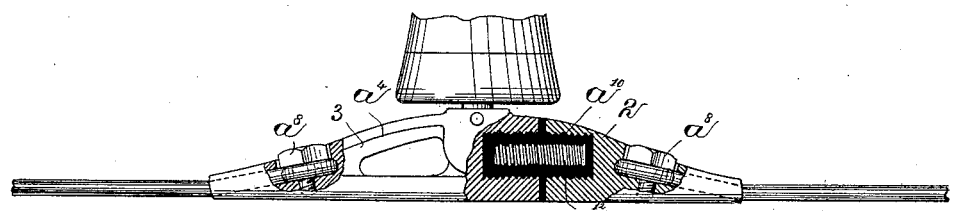
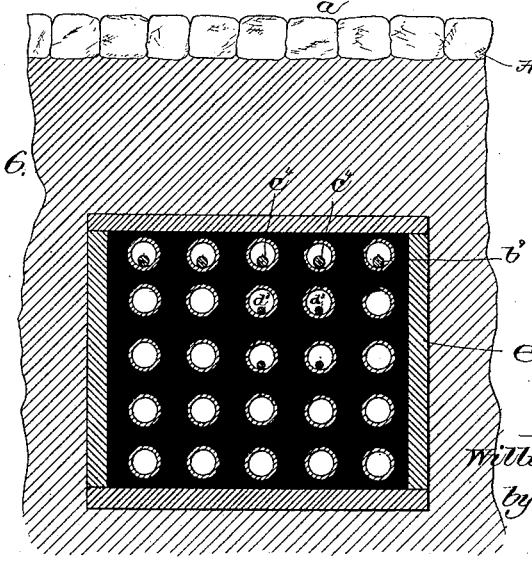
Witnesses,
Howard F. Eaton.
Edgar A. Gadden.
Inventor:
William D. MacQuesten.
by Crosby & Gregory
Att'ys

UNITED STATES PATENT OFFICE.

WILLIAM D. MacQUESTEN, OF NEW YORK, N. Y.

ELECTRIC-RAILWAY SYSTEM.

SPECIFICATION forming part of Letters Patent No. 429,199, dated June 3, 1890.

Application filed September 28, 1889. Serial No. 325,370. (No model.)

*To all whom it may concern:*

Be it known that I, WILLIAM D. MACQUESTEN, of New York, county of New York, State of New York, have invented an Improvement in Electric-Railway Systems, of which the following description, in connection with the accompanying drawings, is a specification, like letters and figures on the drawings representing like parts.

This invention has for its object to provide an electric-railway system of novel construction especially adapted to be used on electric railways in which the power is taken from a trolley-wire or conductor suspended in the air above the car.

In accordance with my invention the trolley-wire or working-conductor is made in sections separated from each other by suitable insulation, whereby each section may be removed independently of the others for renewal or other purpose. The sections referred to will preferably be about one thousand feet in length, more or less, so that the car by its momentum can coast by the break in the trolley-wire caused by the removal of a section of said wire. Each section of the trolley-wire will preferably be connected by a working-wire feeder to a side main or conductor, which for the best results may also be made in sections, the end of each side-main section being preferably connected to contact-plates in boxes, which may be secured to poles at the sides of the road-bed. The side main has connected to it at suitable intervals apart feed-wires, preferably connected to the dynamo at the power-station, the said feed-wires being hereinafter designated by me as "side-main feeders." The side-main feeders are preferably connected to contact-plates in the boxes referred to, and may be electrically connected with or disconnected from the contact-plates, to which the side main wires are joined by suitable switches. Each side-main feeder will preferably be provided with an equalizer or resistance-coil, which may be located in the power-station, by which the resistance, and consequently the electro-motive force, in each individual side-main feeder may be regulated, and the electro-motive force of all the side main feeders, and thereby of the side main, may be maintained uniform. Each side-main feeder is preferably electrically connected in the box referred to with a pressure line or wire connected to a voltmeter at the power-station to act as a tell-tale and register the electro-motive on the line at the box. Each side-main feeder will preferably have connected to it an ampère-meter, by which to register the amount of current passing through the said feeder. The side main and its feeders will preferably be located in a conduit under ground.

The particular features in which my invention consists will be pointed out in the claims at the end of this specification.

Figure 1 is a perspective view of a sufficient portion of an electric-railway system embodying my invention to enable it to be understood; Fig. 2, a diagram of the circuits to more clearly show my invention; Fig. 3, a detail, on an enlarged scale, showing one of the boxes attached to a post, the door of the said box being open; Fig. 4, a transverse section of the box shown on line $x$ $x$, Fig. 3; Fig. 5, a detail in side elevation, partially broken out, of an insulator, showing two sections of trolley-wire secured to said insulator; and Fig. 6, a detail in section of one form of conduit, in which the side main and its feed-wires are connected.

Referring to Fig. 1, A represents a roadway or street provided, as shown, with a double railway-track $a$ $a'$. The tracks $a$ $a'$ have suspended above them, as shown, two trolley-wires or working-conductors $a^2$ $a^3$, supported at suitable intervals apart by insulating-hangers $a^4$, fastened to span wires or rods $a^5$, extended across the street and secured, preferably, to hollow posts $a^6$. Each trolley-wire or working-conductor $a^2$ $a^3$ in accordance with my invention may be made up of sections, and each section has its opposite ends secured, as by screw or bolt $a^8$, to one end (marked 2) of a shoe, (see Fig. 5,) forming part of the insulator $a^4$, one end of an adjoining section of the trolley-wire being secured by a similar bolt or screw $a^8$ to another portion (marked 3) of the said shoe. The parts 2 3 of the shoe are firmly secured together, but are electrically disconnected from each other by insulation $a^{10}$, (see Fig. 5,) the part 2 being united, as herein shown, to the part 3 by a threaded rod $a^{12}$, engaging screw-threads on the interior of the insulation $a^{10}$, which in practice is preferably molded into each part 2 3 and provided with the suitable screw-threads; but instead of the particular manner shown for uniting the parts 2 3 any other usual or well-known means may be employed for electrically disconnecting the said parts.

Each section of trolley-wire or working-conductor $a^3$ has connected to it one end of a working-wire feeder $b$, extended to one of the posts $a^6$, and preferably passed down through the said post and connected, as herein shown, to a plate $b'$, (see Fig. 3,) joined by a fuse wire or strip $b^2$ to a contact-plate $b^3$, forming one member of a switch, the co-operating member of which is shown as a disk or plate $b^4$, which may be electrically connected with a contact-plate $b^3$, as herein shown, by a plug $b^5$, of any usual or well-known construction, it being shown in Fig. 4 as composed of two metallic arms separated for a portion of their length by insulation $b^6$. The contact-plates $b^3$ $b^4$ are preferably located within a box $b^7$, provided with a suitable door $b^8$ and forming an integral part of the hollow post $a^6$, and each feed-wire $b$ is connected, in accordance with my invention, to a side main, preferably composed of independent sections of wire or other suitable conductor $b^9$, the said side main being shown as secured to a plate $b^{10}$, joined by a fuse-wire $b^{12}$ to a contact-plate $b^{13}$, which may be electrically connected with the disk $b^4$ by a plug $b^{14}$. The end of the next adjoining side main section $b^9$ (marked 3, Fig. 3) is connected to a plate $c$, joined by a fuse-wire $c'$ to a contact-plate $c^2$, electrically connected, as shown, to the disk $b^4$ by a plug $c^3$. The side main $b^9$ at suitable intervals apart may be connected to the dynamo D by side main feeders $c^4$, there being two such feeders shown in Fig. 2 and marked 5 and 6.

Each side-main feeder $c^4$ is connected to a plate $c^7$, joined by a fuse-wire $c^8$ to a contact-plate $c^9$, which may be electrically connected to the disk $b^4$ by a plug $c^{10}$. The side-main feeders $c^4$ in practice will preferably be connected to the boxes on posts located a considerable distance apart. For instance, as shown in Fig. 2, the side-main feeders are connected to the first and third posts looking toward the left in said figure; but, if desired, any number of posts may intervene between the posts which are connected.

Each side-main feeder $c^4$ is preferably connected to an equalizer or resistance $d$ of any usual construction, by which the resistance of said feeder may be varied at will, and consequently the electro-motive force at the terminal of the said feeder regulated.

Each side-main feeder may be provided with an ampère-meter $d'$, preferably located in the power-station, and by which the amount of current flowing over each side-main feeder may be made known.

The ampère-meter $d'$ of each side-main feeder will preferably be connected by a safety-fuse $d^{20}$ and switch $d^{21}$ to a line $d^{23}$, technically known as a "bus-line," and the said bus-line is joined by a wire $d^{24}$ to the dynamo, the line $d^{24}$ being preferably provided with an ampère-meter $d^{25}$, by which the output of the machine may be made known, the said wire also being preferably provided with a switch $d^{26}$.

The plate $c^7$ in each box to which the feeders are connected has joined to it one end of a wire $d^3$, connected to a voltmeter $d^4$ of any usual construction, by which the pressure on the side mains, and therefore on the trolley-line at the boxes, may be made known.

As shown in Fig. 2, there are two pressure-wires $d^3$, each connected to a voltmeter $d^4$, and the said voltmeters are connected by a common wire $d^5$ to the ground.

In the overhead system of electric railway as commonly constructed the ground forms one-half the circuit, and, as represented in Fig. 2, the dynamo $b$ is connected by wire $d^6$ to the ground.

Referring to Figs. 2 and 3, the current from the dynamo flows from the positive brush $d^7$ through the feeders $c^4$ to the boxes $b^7$, (marked 10 12 in Fig. 2.) The current passes from the plate $c^7$ into the boxes 10 12, through the fuse-wire $c^8$, contact-plate $c^9$, plug-switch $c^{10}$, through the central plate $b^4$, and if the plugs $c^3$ $b^{14}$ are inserted between the contact-plates $c^2$ $b^{13}$, respectively, as shown in Fig. 3, the sections of the side main connected with the boxes 10 12 will be electrically charged—that is, they will be "alive," as it is technically known, and if the plug $b^5$ be inserted into its place so as to connect the plate $b^4$ with the contact-plate $b^3$ the section of the trolley-wire with which the feed-wire $b$ is connected will be electrically charged or energized. In this manner it can readily be seen that by feeding the trolley-wire throughout its length at suitable intervals apart the electro-motive force on the line may be maintained substantially uniform—that is, the drop in potential or loss of current may be the same at different distances from the power or central station, thereby increasing the practicability and value of the system. If for any reason it is desired to remove one section of the trolley-wire—as, for instance, the section marked 15 in Fig. 2—the bolts or screws $a^8$, connecting the side main to the insulating-hangers $a^4$, may be withdrawn and the wire detached therefrom, the feed-wire $b$, normally joined to the said trolley-wire section, being disconnected from it. It will thus be seen that a break in the trolley-wire exists between the insulator-hangers $a^4$, (marked 16, 17, Fig. 2,) and with systems as now constructed the said break could not be readily repaired without stopping or interrupting the working of the system, whereas in accordance with my invention the sections of trolley-wire on the opposite sides of the break are maintained alive by means of the side main and its feeders, and the section 15 may be readily replaced without interfering with the working of the system and without danger to the workmen.

In practice, when my improved system is adapted to the overhead system of electric railway, the side main and its feeders, as well as the pressure-wires $d^3$, will preferably be located in a conduit $e$, herein shown as a box buried beneath the surface of the road and at one side thereof. By means of the pressure-wires $d^3$ being electrically connected with the feeder $c^4$ the electro-motive force at each box is made known at the power-station, and if the electro-motive force at one box should fall below the normal, or what is required, the equalizer $d$ may be so manipulated as to bring the electro-motive force at the said box up to the normal, thus maintaining the electro-motive force of the entire line substantially uniform.

I have herein shown my invention as applied to an overhead system of the electric railway; but I do not desire to limit myself in this respect, as it is evident the same may be employed in a conduit system of electric railway. So, also, I do not desire to limit my invention to the use of a ground-circuit, as it is equally well adapted to be used in connection with a metallic circuit.

I prefer to employ the system as described; but it is evident that parts of the system may be omitted and may be applied to electric-railway systems as now constructed—as, for instance, the sectional side main and its feeders may be connected to a trolley-wire which is not composed of independent sections, but which may be a single wire substantially such as now used. So, also, the side main may be omitted and the trolley-wire made of sections, each of which has connected to it a feed-wire $b$, and either of the modifications referred to would be an improvement on the electric-railway system as now constructed and commonly used.

I claim—

1. In an electric-railway system, the combination, with a main or working wire or conductor composed of insulated sections, of a side main composed of independent sections, a working-wire feeder to connect the side-main sections to the main-wire sections, a side-main feeder, and a pressure-wire, substantially as described.

2. In an electric-railway system, the combination, with a main or working wire or conductor composed of independent sections insulated from each other, of a working-wire feeder for said sections and a pressure-wire, substantially as described.

3. In an electric-railway system, the combination, with a main or working wire, of a side main composed of sections, a working-wire feeder to connect the side-main sections to the main wire, and a side-main feeder, substantially as described.

4. In an electric-railway system, the combination, with a main or working wire, of a side main composed of sections, a working-wire feeder to connect the side-main sections to the main wire and a side-main feeder, and a pressure-wire, substantially as described.

5. In an electric-railway system, the combination, with a main or working wire, of a side main composed of sections, a working-wire feeder to connect the side-main sections to the main wire, and a switch to connect the side-main sections, substantially as described.

6. In an electric-railway system, the combination, with a main or working wire, of a side main composed of sections, a working-wire feeder to connect the side-main sections to the main wire, a side-main feeder, and an equalizer in said side-main feeder, substantially as described.

7. In an electric-railway system, the combination, with a main or working wire, of a side main composed of sections, a working-wire feeder to connect the side-main sections to the main wire and a side-main feeder, an equalizer in said side-main feeder, and an ampère-meter connected to said side-main feeder, substantially as described.

8. In an electric-railway system, the combination, with a main or working wire, of a side main composed of sections, a working-wire feeder to connect the side-main sections to the main wire, a plurality of side-main feeders, a bus-line to which the side-main feeders are connected, an equalizer, and an ampère-meter in each side-main feeder, a dynamo connected to the said bus-line, and an ampère-meter connected in circuit with the dynamo and bus-line, substantially as described.

9. In an electric-railway system, the combination, with a main or working wire or conductor composed of independent sections insulated from each other, of a working-wire feeder for said sections and a pressure-wire and a voltmeter connected to the said pressure-wire, substantially as described.

10. In an electric-railway system, the combination, with a main or working wire, of a side main composed of sections, a working-wire feeder to connect the side-main sections to the main wire, a side-main feeder, a pressure-wire, and a switch-box provided with contact plates or members to which the working-wire feeder, side-main sections, side-main feeder, and pressure-wire are connected, fuses to protect said wires, and means to effect the electrical connection between said wires, substantially as described.

In testimony whereof I have signed my name to this specification in the presence of two subscribing witnesses.

WM. D. MACQUESTEN.

Witnesses:
JAS. H. CHURCHILL,
E. J. BENNETT.